US008451144B2

(12) United States Patent
Ishihara et al.

(10) Patent No.: US 8,451,144 B2
(45) Date of Patent: May 28, 2013

(54) FLAPS OVERSPEED ADVISORY SYSTEM

(75) Inventors: Yasuo Ishihara, Kirkland, WA (US);
Steve Johnson, Issaquah, WA (US);
Kevin J Conner, Kent, WA (US)

(73) Assignee: Honeywell International Inc.,
Morristown, NJ (US)

( * ) Notice: Subject to any disclaimer, the term of this patent is extended or adjusted under 35 U.S.C. 154(b) by 585 days.

(21) Appl. No.: 12/365,778

(22) Filed: Feb. 4, 2009

(65) Prior Publication Data
US 2010/0194599 A1 Aug. 5, 2010

(51) Int. Cl.
*G08B 23/00* (2006.01)
(52) U.S. Cl.
USPC .................. 340/969; 340/945; 701/1; 701/7; 701/9
(58) Field of Classification Search
USPC ................. 340/969, 945, 978, 966, 963, 967, 340/971; 701/3, 7–9, 14; 244/75.1, 211, 212, 244/213, 214, 215, 216
See application file for complete search history.

(56) References Cited

U.S. PATENT DOCUMENTS

| | | | | |
|---|---|---|---|---|
| 2,738,491 A * | 3/1956 | Mihalakis | ...................... | 340/960 |
| 3,037,725 A | 2/1960 | Treffeisen | | |
| 3,604,908 A * | 9/1971 | Loome et al. | ................... | 701/18 |
| 3,614,036 A * | 10/1971 | Foster | ........................... | 244/182 |
| 3,622,105 A * | 11/1971 | Buchholz et al. | ............. | 244/182 |
| 3,627,236 A * | 12/1971 | Hess | .............................. | 244/182 |
| 3,681,580 A * | 8/1972 | Gwathmey et al. | ................ | 701/6 |
| 3,690,598 A * | 9/1972 | Hans-Dieter Buchholz et al. | ............................ | 244/182 |
| 3,830,451 A * | 8/1974 | Fosness | ......................... | 244/207 |
| 3,947,810 A * | 3/1976 | Bateman et al. | .............. | 340/970 |
| 4,030,065 A * | 6/1977 | Bateman | ....................... | 340/970 |
| 4,042,197 A * | 8/1977 | Boyle et al. | ................... | 244/183 |
| 4,191,347 A * | 3/1980 | Fueyo | ......................... | 244/76 A |
| 4,319,219 A | 3/1982 | Rein-Weston | | |
| 4,433,323 A * | 2/1984 | Grove | ........................... | 340/970 |
| 4,594,592 A * | 6/1986 | Greene | .......................... | 340/959 |
| 4,675,823 A * | 6/1987 | Noland | ......................... | 701/300 |
| 4,849,756 A * | 7/1989 | Bateman | ....................... | 340/970 |
| 5,082,208 A * | 1/1992 | Matich | ......................... | 244/78.1 |
| 5,119,091 A * | 6/1992 | Zweifel | ......................... | 340/968 |
| 5,153,588 A * | 10/1992 | Muller | .......................... | 340/968 |
| 5,220,322 A * | 6/1993 | Bateman et al. | .............. | 340/970 |
| 5,225,829 A * | 7/1993 | Bateman | ....................... | 340/967 |
| 5,361,065 A * | 11/1994 | Johnson et al. | ............... | 340/968 |
| 5,493,293 A * | 2/1996 | Hansen et al. | ................ | 340/968 |
| 5,519,391 A * | 5/1996 | Paterson et al. | ............... | 340/959 |
| 5,686,907 A * | 11/1997 | Bedell et al. | ................. | 340/945 |
| 5,702,072 A * | 12/1997 | Nusbaum | ...................... | 244/225 |
| 5,754,042 A * | 5/1998 | Schroeder et al. | ........ | 324/207.25 |
| 5,912,627 A * | 6/1999 | Alexander | ................. | 340/815.4 |
| 6,043,758 A * | 3/2000 | Snyder et al. | ................. | 340/970 |

(Continued)

*Primary Examiner* — Benjamin C Lee
*Assistant Examiner* — Quang D Pham
(74) *Attorney, Agent, or Firm* — Lowe Graham Jones PLLC

(57) ABSTRACT

A flap advisory system provides an advisory to a pilot informing that a speed of the aircraft should be attended to because of a current or desired flap setting. More specifically, the flap advisory system compares a measured airspeed of the aircraft either directly to a flap placard speed or to a marginal speed range set below the flap placard speed for a given flap setting. If the measured airspeed is determined to be excessive then the system provides an advisory indicating the airspeed is too fast. Further, the system may provide an advisory when a movement of a flap handle is detected such that continued movement of the flap handle would place the flaps in a setting that is inappropriate for the measured airspeed.

7 Claims, 3 Drawing Sheets

U.S. PATENT DOCUMENTS

| | | | |
|---|---|---|---|
| 6,299,108 B1 * | 10/2001 | Lindstrom et al. | 244/213 |
| 6,405,107 B1 | 6/2002 | Derman | |
| 6,486,722 B2 * | 11/2002 | Yamauchi | 327/270 |
| 6,704,624 B2 * | 3/2004 | Ortega et al. | 701/3 |
| 6,711,479 B1 | 3/2004 | Staggs | |
| 6,794,007 B2 | 9/2004 | Carr et al. | |
| 6,940,427 B2 * | 9/2005 | Bateman | 340/967 |
| 6,982,655 B2 * | 1/2006 | Vialleton et al. | 340/969 |
| 7,068,187 B2 | 6/2006 | Ishihara et al. | |
| 7,088,264 B2 * | 8/2006 | Riley | 340/963 |
| 7,132,960 B2 * | 11/2006 | Glover | 340/945 |
| 7,164,366 B2 * | 1/2007 | Delaplace et al. | 340/945 |
| 7,185,538 B2 * | 3/2007 | Hager et al. | 73/200 |
| 7,198,427 B2 | 4/2007 | Carr et al. | |
| 7,274,308 B2 * | 9/2007 | Bateman et al. | 340/959 |
| 7,293,744 B2 * | 11/2007 | Perez-Sanchez et al. | 244/211 |
| 7,394,402 B2 | 7/2008 | Ishihara et al. | |
| 7,398,182 B2 * | 7/2008 | Petit | 702/182 |
| 7,436,323 B2 | 10/2008 | Ishihara et al. | |
| 7,945,425 B2 * | 5/2011 | Marx et al. | 702/183 |
| 8,157,208 B2 * | 4/2012 | Recksiek et al. | 244/99.3 |
| 2001/0052562 A1 | 12/2001 | Ishihara et al. | |
| 2003/0048203 A1 * | 3/2003 | Clary et al. | 340/945 |
| 2003/0122038 A1 * | 7/2003 | Fukada | 244/203 |
| 2004/0044446 A1 | 3/2004 | Staggs | |
| 2004/0128038 A1 * | 7/2004 | Richter et al. | 701/3 |
| 2004/0167685 A1 * | 8/2004 | Ryan et al. | 701/16 |
| 2005/0151027 A1 * | 7/2005 | Recksiek et al. | 244/211 |
| 2005/0192718 A1 * | 9/2005 | Delaplace et al. | 701/3 |
| 2005/0242243 A1 * | 11/2005 | Seve | 244/213 |
| 2005/0270180 A1 | 12/2005 | Ishihara et al. | |
| 2006/0195235 A1 | 8/2006 | Ishihara et al. | |
| 2007/0120708 A1 * | 5/2007 | Ishihara et al. | 340/963 |
| 2007/0126602 A1 | 6/2007 | Bateman et al. | |
| 2007/0142980 A1 * | 6/2007 | Ausman et al. | 701/3 |
| 2008/0039988 A1 * | 2/2008 | Estabrook et al. | 701/14 |
| 2008/0215198 A1 * | 9/2008 | Richards | 701/15 |
| 2008/0255713 A1 * | 10/2008 | Onu et al. | 701/3 |
| 2008/0274091 A1 | 11/2008 | Slepushkin et al. | |
| 2008/0283672 A1 * | 11/2008 | Denzler et al. | 244/213 |
| 2009/0152403 A1 * | 6/2009 | Delaplace et al. | 244/183 |
| 2009/0206197 A1 * | 8/2009 | Degenholtz et al. | 244/99.3 |
| 2009/0302174 A1 * | 12/2009 | Ausman et al. | 244/76 R |
| 2010/0302074 A1 * | 12/2010 | Campagne et al. | 340/971 |

* cited by examiner

FLAPS OVERSPEED ADVISORY SYSTEM

BACKGROUND OF THE INVENTION

Pilots may sometimes encounter a flap over-speed situation after takeoff or during landing for the trailing edge flap system. For example during takeoff, the pilot may forget to retract the flaps after takeoff while the aircraft accelerates, and thus the speed of the aircraft may quickly exceed a flap design speed. During landing, the pilot may set the flaps too soon or alternatively have set the flaps and then accelerate beyond the flap design speed.

Trailing edge flaps are deployed to increase the aspect ratio of the wing and to provide additional lift for the aircraft. The trailing edge flaps are generally moved through a number of different detents or positions as the aircraft reaches its predetermined flap design speed (commonly referred to as flap placard speeds) for a given detent. When the speed of the aircraft exceeds the predetermined flap placard speed for a given detent, the flap system may incur structural damage or be required to undergo a mandatory inspection before the aircraft may be placed back into service. Most aircraft have a visual indication of the flap design speeds on a primary flight display in the cockpit; however flap over-speed situations continue to occur.

SUMMARY OF THE INVENTION

The present invention generally relates to a system and methods for controlling the deployment of trailing edge flaps for an aircraft. More specifically, the system includes a processor having a number of inputs used to evaluate whether an advisory should be provided to a pilot of the aircraft regarding the speed of the aircraft relative to the deployment of a flap system of the aircraft. Further, the methods include whether to provide the advisory based on a predetermined marginal speed range associated with the flap placard speeds or based on detecting a change in a flap handle position.

In one aspect of the invention, a method for controlling deployment of trailing edge flaps for an aircraft includes the steps of (1) measuring an airspeed of the aircraft; (2) comparing the measured airspeed to a flap placard speed corresponding to a flap setting; (3) determining whether the measured airspeed exceeds a lower end of a predetermined marginal speed range the flap placard speed, wherein the predetermined marginal speed range is set lower than the flap placard speed; and (4) when the measured airspeed becomes greater than the lower end of the predetermined marginal speed range, providing an advisory informing the pilot that the speed of the aircraft is too fast.

In another aspect of the invention, a method for controlling deployment of trailing edge flaps for an aircraft includes the steps of (1) measuring an airspeed of the aircraft; (2) comparing the measured airspeed to a predetermined flap placard speed corresponding to a selected flap setting; (3) determining a flap handle position; (4) detecting a change in the flap handle position when the measured airspeed exceeds the predetermined flap placard speed; and (5) and upon detecting the change in the flap handle position, providing an audible advisory informing the pilot that the speed of the aircraft is too fast.

In yet another aspect of the invention, a flap deployment system for an aircraft includes a processor for receiving a plurality of inputs and for providing information for one or more advisories to be made available to a pilot. In addition, the system includes an advisory output system in communication with the processor. The advisory output system operates to provide an indication to the pilot that the speed of the aircraft is too fast when the measured airspeed exceeds a lower end of a predetermined marginal speed range associated with a current flap setting or when the measured airspeed exceeds the flap placard speed of a desired flap setting.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
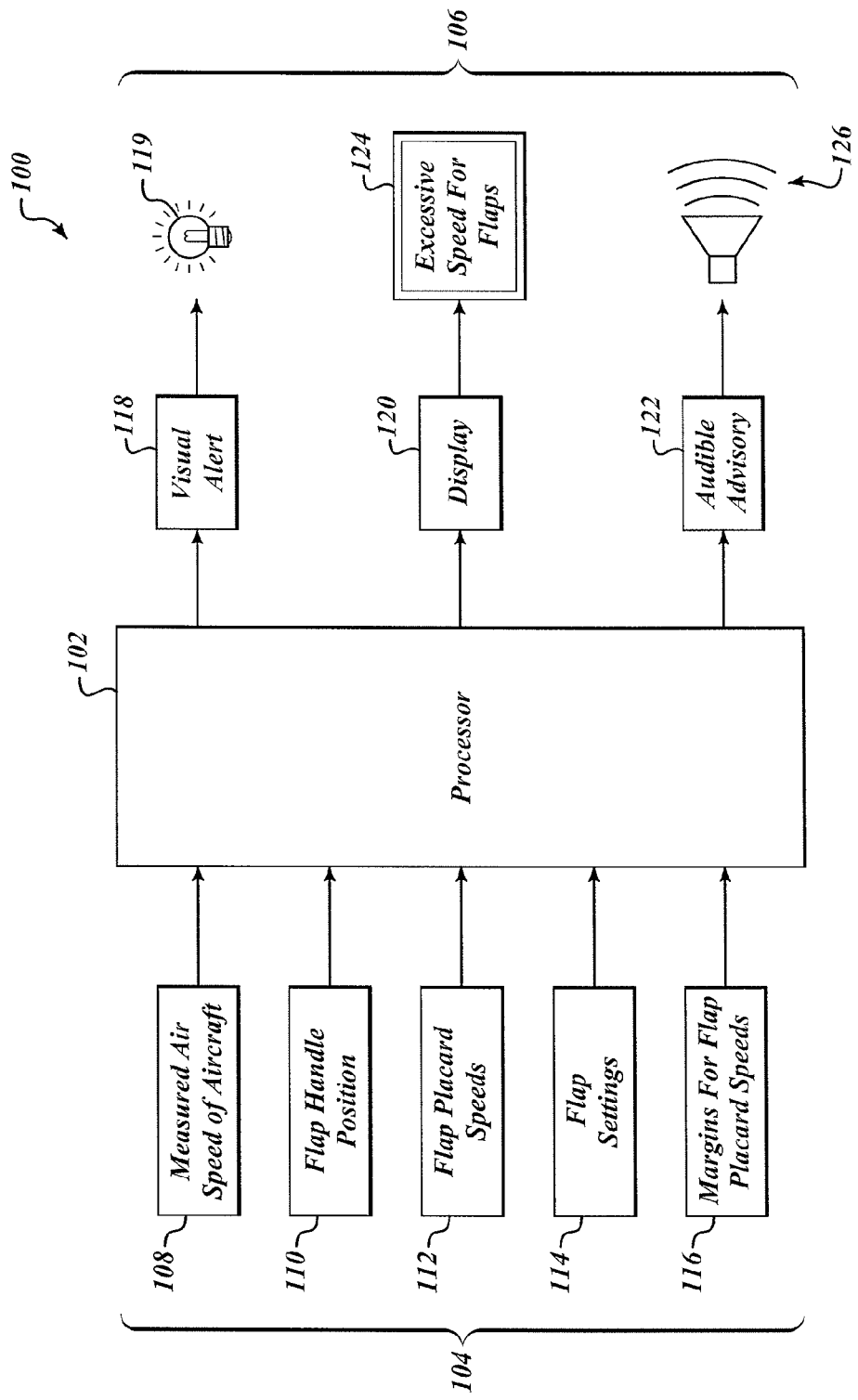
FIG. 1 is a diagram of a flaps advisory system for providing an indication to a pilot of their aircraft speed relative to a flap system of the aircraft according to an embodiment of the invention.

FIG. 1 shows a flap advisory system 100 having a controller or processor 102 that receives a plurality of inputs 104 and upon evaluating at least two of the inputs then provides one or more advisories 106 to a pilot (not shown) of an aircraft (not shown). The processor 102 may be a microprocessor, firmware, executable code, an existing aircraft subsystem having a general purpose processor or any combination thereof. In one embodiment, the processor 102 operates as a subsystem of an Enhanced Ground Proximity Warning System (EGPWS) or as a subsystem of a Stable Approach Monitor (SAM) system. Other examples of existing aircraft systems with a general purpose processor suitable for hosting the flap advisory system 100 may include, but are not limited to, a Traffic Collision and Avoidance System (TCAS) or a flight management system (FMS).

The flap placard speeds are predetermined airspeeds corresponding to a structural capacity of the aircraft's flap system. In some cases, the structural design airspeeds are dictated by government regulations. The design flap speeds are a function of the flap setting and restricts the speeds at which flaps may be deployed or retracted. By way of example, during landing the flaps are generally deployed through a series of settings, commonly referred to as detents, such as Detent 5, Detent 15, Detent 20, Detent 25 and Detent 30. In this example, Detent 30 indicates a maximum extension of the flap system while Detent 5 indicates an initial extension. One purpose for extending the flap system is to provide the wing with a larger aspect ratio and more lift during takeoff and landing. Generally, as the flap system becomes further extended, the resulting moment (i.e., air loads) on the flap system generally increases. As such, the flap system is structurally limited from a strength perspective and should not be moved (e.g., further extended during landing) if the airspeed is too great without risking damage to the flap system or at least necessitating a follow-on inspection.

The processor 102 operates to analyze or evaluate at least several of the a plurality of inputs 104, which may include, but are not limited to, a measured airspeed of the aircraft 108, a flap handle position 110, flap placard speeds 112, flap settings 114, and marginal speed ranges for the flap placard speeds 116. At least some of these inputs may be stored in a memory or database (not shown) accessible by the processor 102.

In one embodiment, the processor 102 compares the measured airspeed 108 to the flap placard speed 112 associated with the present flap setting 114. In this comparison, the processor 102 determines whether the measured airspeed 108 exceeds the flap placard speed 112 within a marginal speed range 116. Preferably, the speeds within the marginal speed range 116 are set to be lower than the corresponding flap placard speed 112. By way of example a lower end of the marginal speed range 116 may be about ten percent lower than the flap placard speed, such that if the flap placard speed is 270 knots then the lower end of the marginal speed range would be 243 knots and the marginal speed range would be between 243-270 knots. It is appreciated however; the lower ends and the marginal speed ranges may be selected using other percentage differences or using other criteria that do not have a direct percentage correlation to the flap placard speed. When the measured airspeed becomes greater than the lower end of the predetermined marginal speed range 116, the system 100 provides one or more advisories 106 informing the pilot that the speed of the aircraft is too fast. The advisories 106 may take the form of a visual alert 118 such as a light emitting diode 119 located on the flight panel of the cockpit, a word display 120 providing a textual message 124, or an audible advisory 122, such as a speaker system 126, announced in the cockpit. By way of example, the word display 120 may provide information about the airspeed being too fast, for example "Excessive Speed for Flaps" and the audible advisory 122 may announce a phrase such as "TOO FAST, TOO FAST."

In another embodiment, the processor 102 receives input about the flap handle position 110 to determine a current position for the flap handle. One or more sensors (not shown) may detect a change in the flap handle position 110 and provide this information to the processor 102. Contemporaneously, the processor 102 also compares the measured speed 108 to the flap placard speed 112 for a present or desired flap setting 114. When the measured airspeed 108 exceeds the flap placard speed 112 of a present or desired flap setting 114 and upon detecting the change in the flap handle position 110, the system 100 provides one or more advisories 106 informing the pilot that the speed of the aircraft is too fast. The advisories 106 may take the faun of those discussed previously.

The system 100 may advantageously provide more timely alerts during at least two types of aircraft scenarios. In a first scenario the aircraft accelerates while the flap setting 114 remains the same (e.g., during takeoff, during a missed landing approach, or during approach when the pilot is trying to adjust a glideslope of the aircraft). In this first scenario the system 100 must know the present flap setting 114, the flap placard speed 112 and the measured airspeed 108. Using this information the system 100 may provide one or more timely advisories 106 to inform the pilot to slow down the aircraft or retract the flaps to avoid exceeding the flap placard speed 112. As noted earlier, the advisories 106 may take a number of forms and may be provided within the marginal speed range 116, which may be adjusted on how rapidly the aircraft is accelerating in order to account for the time it takes for the flaps to be retracted.

Figure 2:
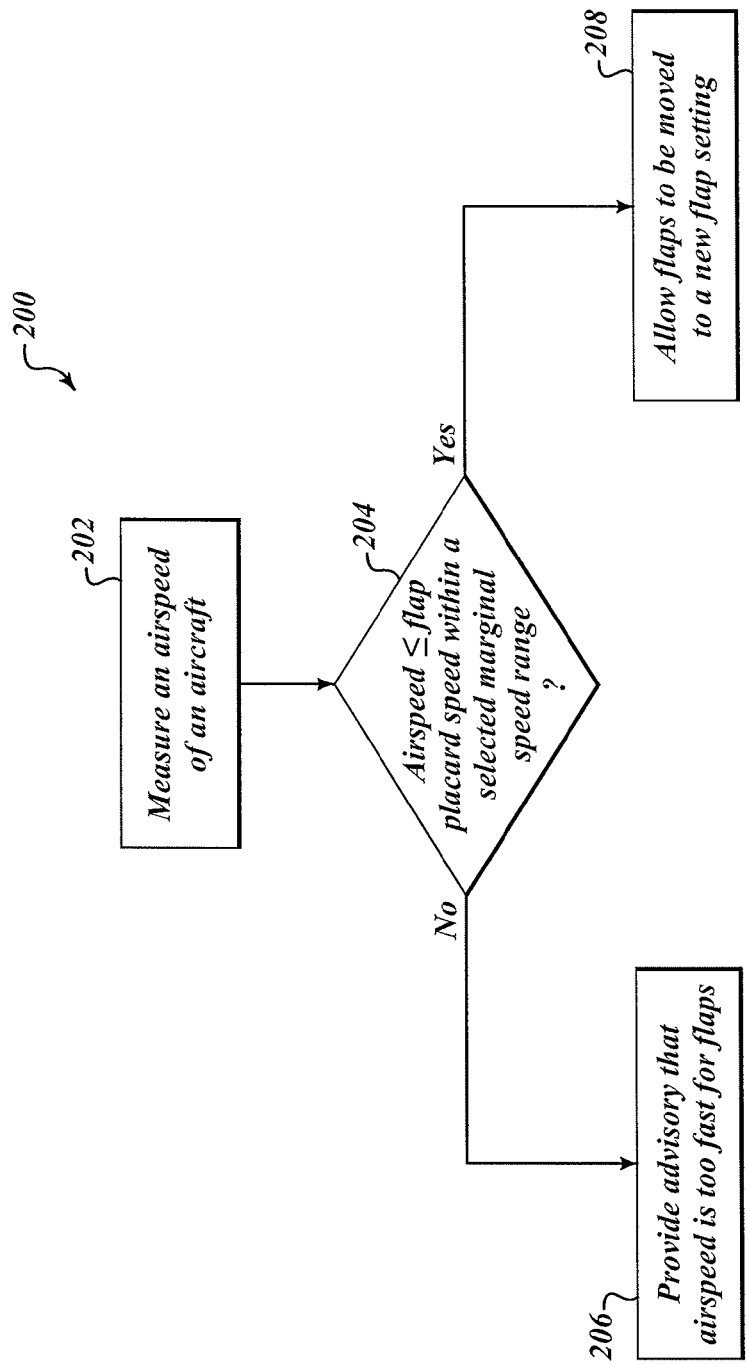
FIG. 2 is a method of providing an advisory to a pilot of an aircraft when the speed of the aircraft is within a predetermined marginal speed range according to an embodiment of the invention.

FIG. 2 shows a method 200 for providing a flaps advisory according to an embodiment of the invention. At Step 202, an airspeed of the aircraft is measured. At Step 204, the measured airspeed is compared to a flap placard speed or to a value within a marginal speed range that corresponds to the flap placard speed. If the airspeed is greater than the flap placard speed or greater than the value within the marginal speed range then at Step 206 an advisory is provided to the pilot that the airspeed is too fast for the existing or the desired flap setting. If the airspeed is less than or equal to the flap placard speed or less than or equal to the value within the marginal speed range then at Step 208 the pilot is permitted to move the flaps to a different setting.

In a second scenario, a flap over-speed condition may occur when the aircraft is decelerating or at a constant speed, but the pilot changes the flap setting. In this scenario, the flap handle position is detected and any movement of the flap handle, which may be indicative of the pilot's intent to move the flaps to a different setting, is also detected. If the pilot attempts to move the flap handle, as determined by a detection any movement of the flap handle, while the aircraft speed exceeds the flap placard speed for the desired flap setting then one or more advisories may be provided to the pilot. In the situation where the aircraft is decelerating, the system may permit the pilot to change the flap setting as soon as the aircraft speed falls below the flap placard speed or below a predetermined speed within the marginal speed range described above.

Figure 3:
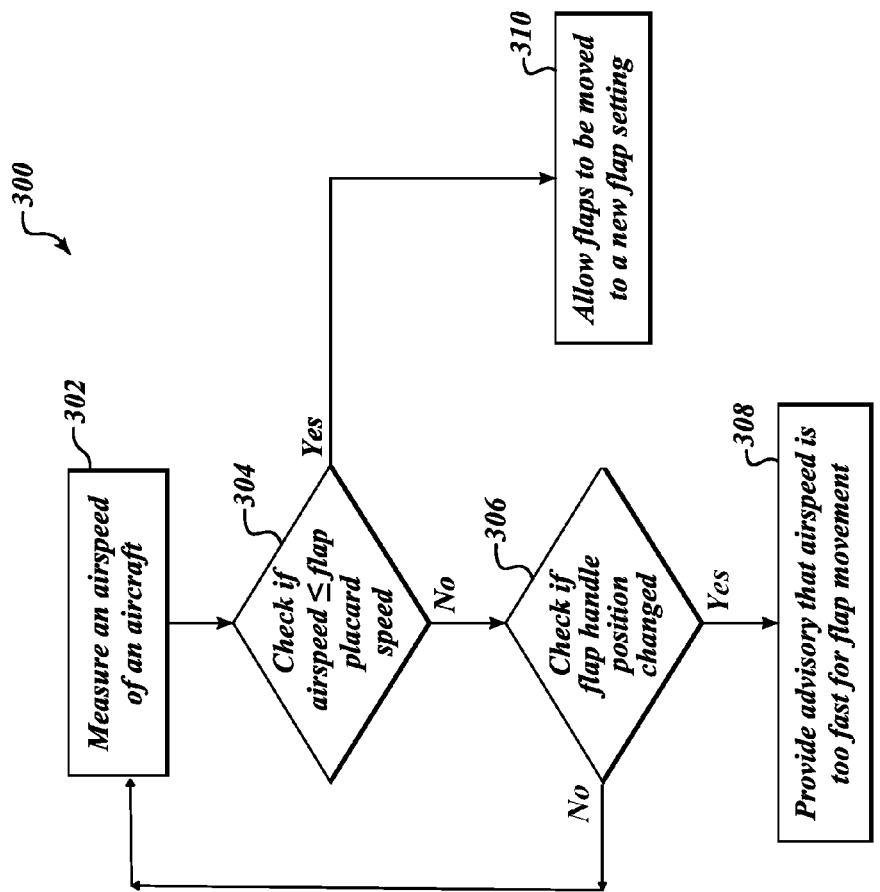
FIG. 3 is a method of providing an advisory to a pilot of an aircraft when the speed of the aircraft exceeds a flap placard speed and when a change in a flap handle position is detected according to an embodiment of the invention

FIG. 3 shows another method 300 for providing a flaps advisory according to an embodiment of the invention. At Step 302, an airspeed of the aircraft is measured. At Step 304, the measured airspeed is compared to a flap placard speed within a selected marginal speed range that corresponds to the flap placard speed. At Step 306, a change in the flap handle position may be detected. If the airspeed is greater than the flap placard speed within the selected marginal speed range and if the flap handle position was changed then at Step 308 an advisory is provided to the pilot that the airspeed is too fast for the intended movement of the flaps to the different setting. If the airspeed is less than or equal to the flap placard speed within the marginal speed range then at Step 310 the pilot is permitted to move the flaps to a new flap setting.

In either scenario, even though the aircraft may be at an appropriate altitude, the flap advisory system 100 provides a more timely awareness of the excessive airspeed to prevent the pilot from deploying or attempting to deploy the flaps. As such, the flap advisory system 100 re-focuses the pilot's attention on the present problem, which is to reduce the airspeed of the aircraft.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A flap deployment system for an aircraft comprising:
    a processor for receiving a plurality of inputs and for providing information for one or more advisories to be made available to a pilot, wherein the plurality of inputs includes a detection of movement of a flap handle located in a cockpit of the aircraft, a measured airspeed of the aircraft, and flap placard speed; and
    an advisory output system in communication with the processor, the advisory output system operable to provide an indication to the pilot that the speed of the aircraft is too fast when the measured airspeed exceeds the flap placard speed of a desired flap setting that is based on the detected movement of the flap handle, wherein the desired flap setting is different than current flap setting.

2. The flap deployment system of claim 1, wherein the plurality of inputs includes at least the measured airspeed and the flap placard speeds for the flap settings.

3. The flap deployment system of claim 1, wherein the indication to the pilot includes an audible advisory indicating that the speed of the aircraft is too fast.

4. The flap deployment system of claim 1, wherein the plurality of inputs includes predetermined marginal speed ranges corresponding to a number of flap placard speeds at respective flap settings.

5. A method for controlling deployment of trailing edge flaps for an aircraft, the method comprising:
- detecting any movement of a flap handle in a cockpit of the aircraft;
- determining a desired flap setting based on the detected movement of the flap handle;
- measuring an airspeed of the aircraft;
- comparing the measured airspeed to a flap placard speed corresponding to the desired flap setting; and
- if the measured airspeed is greater than the flap placard speed corresponding to the desired flap setting, providing an advisory informing the pilot that the speed of the aircraft is too fast,
- wherein the desired flap setting is different than current flap setting.

6. The method of claim 5, wherein the flap placard speed includes a speed associated with a landing flap setting.

7. The method of claim 5, wherein providing the advisory includes providing an audible advisory.

* * * * *